(12) United States Patent
Yamaguchi

(10) Patent No.: US 11,620,092 B2
(45) Date of Patent: Apr. 4, 2023

(54) IMAGE FORMING APPARATUS

(71) Applicant: KYOCERA Document Solutions Inc., Osaka (JP)

(72) Inventor: Hirofumi Yamaguchi, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/818,485

(22) Filed: Aug. 9, 2022

(65) Prior Publication Data

US 2022/0385779 A1 Dec. 1, 2022

Related U.S. Application Data

(63) Continuation of application No. 17/507,894, filed on Oct. 22, 2021, now Pat. No. 11,409,479.

(30) Foreign Application Priority Data

Oct. 29, 2020 (JP) .............................. JP2020-181193

(51) Int. Cl.
*H04N 1/00* (2006.01)
*G06F 3/12* (2006.01)
*H04L 12/12* (2006.01)

(52) U.S. Cl.
CPC .......... *G06F 3/1221* (2013.01); *G06F 3/1229* (2013.01); *H04L 12/12* (2013.01); *H04N 1/00888* (2013.01); *H04N 1/00904* (2013.01); *H04N 1/00907* (2013.01)

(58) Field of Classification Search
CPC ..... G06F 3/1221; G06F 3/1229; H04L 12/12; H04N 1/00888; H04N 1/00904; H04N 1/00907
USPC ........................................................ 358/1.13
See application file for complete search history.

(56) References Cited

U.S. PATENT DOCUMENTS

| | | | |
|---|---|---|---|
| 10,896,010 B1* | 1/2021 | Marunouchi | G06F 1/3215 |
| 2016/0105581 A1* | 4/2016 | Hikichi | H04N 1/32741 358/1.14 |
| 2018/0176404 A1* | 6/2018 | Onishi | G06F 1/3231 |
| 2020/0133593 A1* | 4/2020 | Watanabe | G06F 3/1236 |

* cited by examiner

*Primary Examiner* — Allen H Nguyen
(74) *Attorney, Agent, or Firm* — Lex IP Meister, PLLC

(57) ABSTRACT

A image forming apparatus includes a power control unit, an operation mode control unit, and a first timer. The power control unit performs control so as to switch between a normal power state for supplying the operation power supply voltage to the image forming unit, a first power saving state for not supplying the operation power supply voltage to the image forming unit, and a second power saving state having less power consumption than the first power saving state. The operation mode control unit performs control so as to switch a normal mode corresponding to a normal power state, a first power saving mode corresponding to a first power saving state, and a second power saving mode corresponding to a second power saving state.

5 Claims, 6 Drawing Sheets

FIG. 2A

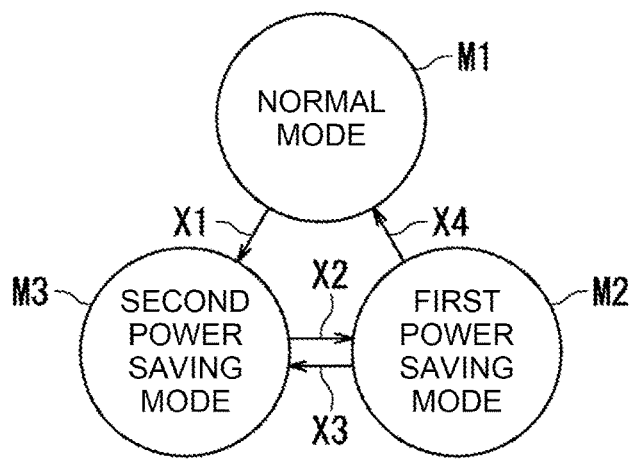

FIG. 2B

| OPERATION MODE | COMMUNICATION UNIT OPERATION UNIT | CONTROL UNIT | PRINT ENGINE UNIT ENGINE CONTROL UNIT |
|---|---|---|---|
| NORMAL MODE | ○ | ○ | ○ |
| FIRST POWER SAVING MODE | ○ | ○ | × |
| SECOND POWER SAVING MODE | ○ | × | × |

○ : POWER-ON
× : POWER-OFF

FIG. 2C

| TRANSITION FACTOR | CONTENT |
|---|---|
| X1 | DEPRESSION OF ENERGY SAVING KEY<br>COUNTING COMPLETION OF SECOND TIMER |
| X2 | INTERRUPT OF ENERGY SAVING KEY<br>INTERRUPT OF FIRST TIMER |
| X3 | COUNTING COMPLETION OF SECOND TIMER |
| X4 | RECEPTION OF PACKET OF PRINT JOB<br>DEPRESSION OF ENERGY SAVING KEY |

IMAGE FORMING APPARATUS

INCORPORATION BY REFERENCE

This application is a continuation application of U.S. patent application Ser. No. 17/507,894 filed on Oct. 22, 2021, which is based upon, and claims the benefit of priority from, corresponding Japanese Patent Application No. 2020-181193 filed in the Japan Patent Office on Oct. 29, 2020, the entire contents of which are incorporated herein by reference.

BACKGROUND

The present disclosure relates to an image forming apparatus.

A typical image forming apparatus includes a communication unit and an operation mode control unit, and the communication unit communicates with an external device via a network. The operation mode control unit increases the time when the communication unit is activated in a time zone with many image processing requests and decreases the time when the communication unit is activated in a time zone with few image processing requests.

SUMMARY

The image forming apparatus according to the present disclosure includes an image forming unit, a reception unit, a power control unit, an operation mode control unit, and a first timer. The image forming unit forms an image on a recording medium. The reception unit receives a packet from outside. The power control unit performs control so as to switch between a normal power state in which an operation power supply voltage is supplied to the image forming unit, a first power saving state in which power consumption is reduced from the normal power state by not supplying the operation power supply voltage to the image forming unit, and a second power saving state in which power consumption is less than the first power saving state. The operation mode control unit controls to switch between a normal mode being an operation mode corresponding to the normal power state, a first power saving mode being an operation mode corresponding to the first power saving state, and a second power saving mode being an operation mode corresponding to the second power saving state. The first timer counts the first time. The first timer starts counting the first time immediately after switching to the second power saving mode, and suppresses switching from the second power saving mode to the first power saving mode by the operation mode control unit even if the reception unit receives the packet until counting of the first time is completed.

BRIEF DESCRIPTION OF THE DRAWINGS

FIG. 2A is an operation mode transition diagram of the image forming apparatus, FIG. 2B is a diagram illustrating an example of a power consumption state of each operation mode, and FIG. 2C is a diagram illustrating an example of a transition factor of the operation mode.

DETAILED DESCRIPTION

Figure 1:
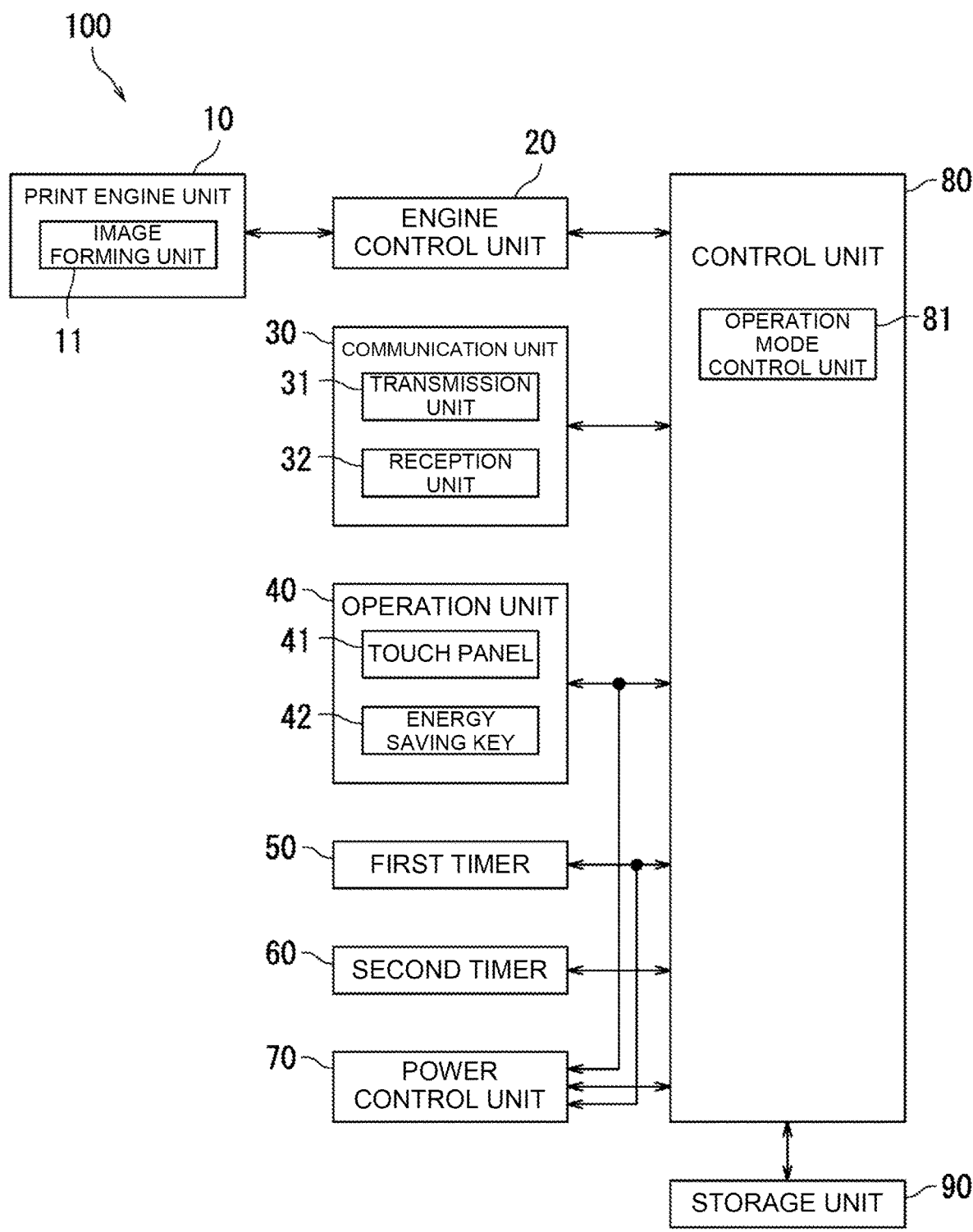
FIG. 1 is a block diagram illustrating an example of an image forming apparatus according to an embodiment of the present disclosure.

Embodiments of the present disclosure will be described with reference to the drawings. In the drawings, the same or equivalent parts are designated by the same reference numerals and description thereof is not repeated.

An image forming apparatus 100 according to an embodiment will be described with reference to FIG. 1. FIG. 1 is a block diagram illustrating an example of the image forming apparatus 100. The image forming apparatus 100 is, for example, a printer.

As illustrated in FIG. 1, the image forming apparatus 100 includes a print engine unit 10, an engine control unit 20, a communication unit 30, an operation unit 40, a first timer 50, a second timer 60, a power control unit 70, a control unit 80, and a storage unit 90. The control unit 80 is connected to the engine control unit 20, the communication unit 30, the operation unit 40, the first timer 50, the second timer 60, the power control unit 70, and the storage unit 90.

The print engine unit 10 has an image forming unit 11. An image forming unit 11 forms an image on a recording medium by an electrophotographic method. The image forming unit 11 includes a photoreceptor drum, a charging device, an exposure device, a developing device, and a cleaning device. The engine control unit 20 controls the operation of the print engine unit 10.

The communication unit 30 includes a transmission unit 31 and a reception unit 32. The communication unit 30 is connected to an external personal computer via a USB (Universal Serial Bus) cable (not illustrated). The transmission unit 31 transmits the USB packet to outside. The reception unit 32 receives a USB packet from outside. The received USB packet includes packets of various contents such as a packet of a print job and a packet of an information request.

The operation unit 40 receives an instruction from a user. The operation unit 40 includes a touch panel 41 and an energy saving key 42. The touch panel 41 displays various processing results. The energy saving key 42 is one of a plurality of operation keys and is used for a user operation for switching the power consumption state of the image forming apparatus 100. The energy saving key 42 supplies a first interruption signal to the control unit 80 when depressed.

The first timer 50 executes counting according to the set value. A first timer 50 supplies a second interrupt signal to a control unit 80 when counting is completed. A second timer 60 executes counting according to other set values.

The power control unit 70 controls to switch the power consumption state of the image forming apparatus 100 between a normal power state, a first power saving state, and a second power saving state. The normal power state is the power consumption state in which operation power supply voltages are supplied to the print engine unit 10, the engine control unit 20, the communication unit 30, the operation unit 40, and the control unit 80, respectively. The first power saving state is the power consumption state in which power consumption is reduced from the normal power state by not supplying the operation power supply voltage to the print engine unit 10 and the engine control unit 20. Even in the first power saving state, operation power supply voltages are supplied to the communication unit 30, the operation unit 40, and the control unit 80, respectively. The second power saving state is the power consumption state in which power consumption is reduced from the first power saving state by not supplying the operation power supply voltage to the control unit 80. Even in the second power saving state, operation power supply voltages are supplied to the communication unit 30 and the operation unit 40, respectively.

The power control unit 70 switches the power consumption state of the image forming apparatus 100 according to an instruction received from the control unit 80. Further, the first interrupt signal of the energy saving key 42 and the second interrupt signal of the first timer 50 are supplied to the power control unit 70. When the first interrupt signal or the second interrupt signal is supplied to the power control unit 70, the power control unit 70 switches the second power saving state to the first power saving state so that the supply of the operation power supply voltage to the control unit 80 is started.

The storage unit 90 includes a storage device and stores data and a computer program. The storage unit 90 includes a main storage device such as a semiconductor memory and an auxiliary storage device such as a hard disk drive.

The control unit 80 includes a processor such as a central processing unit (CPU), and controls each configuration of the image forming apparatus 100 by executing a computer program stored in the storage unit 90. The control unit 80 executes the computer stored in the storage unit 90 to function as an operation mode control unit 81.

The operation mode control unit 81 performs control so as to switch the operation mode of the image forming apparatus 100 between a normal mode M1, a first power saving mode M2, and a second power saving mode M3. The normal mode M1 is an operation mode corresponding to the normal power state. The first power saving mode M2 is an operation mode corresponding to the first power saving state. The second power saving mode M3 is an operation mode corresponding to the second power saving state.

Next, the operation mode of the image forming apparatus 100 will be described in detail with reference to FIGS. 1, 2A, 2B, and 2C. FIG. 2A is an operation mode transition diagram of the image forming apparatus 100. FIG. 2B is a diagram illustrating an example of the power consumption state of each operation mode. FIG. 2C is a diagram for explaining an example of the transition factor of the operation mode.

As illustrated in FIG. 2A, the operation mode of the image forming apparatus 100 transitions from the normal mode M1 to the second power saving mode M3 due to the occurrence of the first factor X1. The operation mode of the image forming apparatus 100 returns from the second power saving mode M3 to the first power saving mode M2 due to the occurrence of the second factor X2. The operation mode of the image forming apparatus 100 transitions from the first power saving mode M2 to the second power saving mode M3 due to the occurrence of the third factor X3. Further, the operation mode of the image forming apparatus 100 returns from the first power saving mode M2 to the normal mode M1 due to the occurrence of the fourth factor X4.

As illustrated in FIG. 2B, in the normal mode M1, each of the print engine unit 10, the engine control unit 20, the communication unit 30, the operation unit 40, and the control unit 80 is in a power-on state. In the first power saving mode M2, each of the communication unit 30, the operation unit 40, and the control unit 80 is in a power-on state, and the print engine unit 10 and the engine control unit 20 are in a power-off state. In the second power saving mode M3, the communication unit 30 and the operation unit 40 are in a power-on state, and the print engine unit 10, the engine control unit 20, and the control unit 80 are in a power-off state. However, in the second power saving mode M3, the transmission unit 31 of the communication unit 30 may be in the power-off state. In the second power saving mode M3, the touch panel 41 of the operation unit 40 may be in the power-off state.

As illustrated in FIG. 2C, the first factor X1 is depression of the energy saving key 42 or counting completion of the second timer 60. The second factor X2 is an interrupt of the energy saving key 42 or an interrupt of the first timer 50. The third factor X3 is counting completion of the second timer 60. The fourth factor X4 is packet reception of a print job or depression of the energy saving key 42.

When the energy saving key 42 is depressed in the normal mode M1, a transition to the second power saving mode M3 occurs. When the energy saving key 42 is depressed in the second power saving mode M3, a first interrupt signal is supplied to the control unit 80, and return to the first power saving mode M2 occurs. When the energy saving key 42 is depressed in the first power saving mode M2, return to the normal mode M1 occurs. When counting of the second timer 60 is completed in the normal mode M1, a transition to the second power saving mode M3 occurs. When counting of the second timer 60 is completed in the first power saving mode M2, too, a transition to the second power saving mode M3 occurs.

Figure 3:
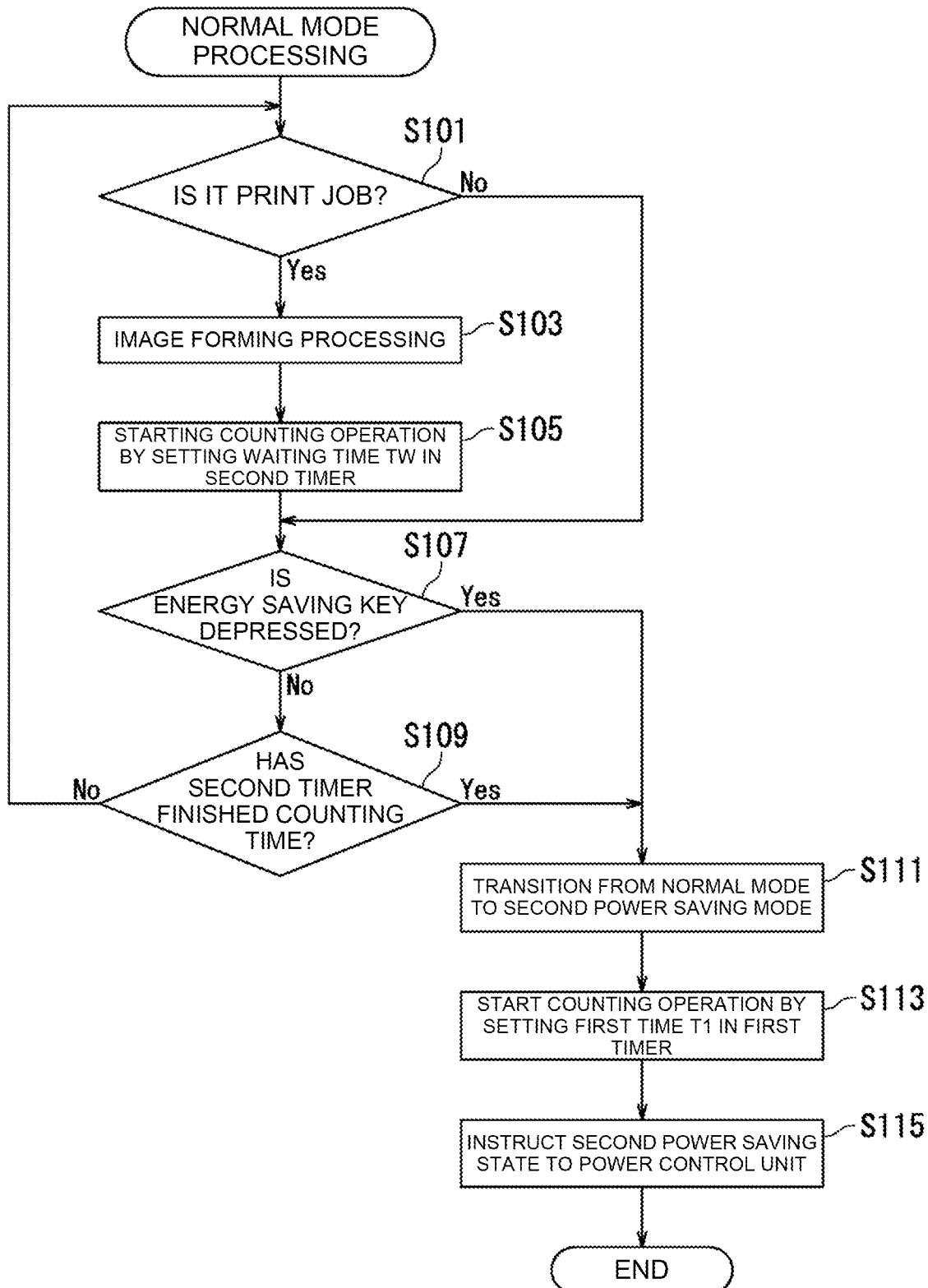
FIG. 3 is a flowchart illustrating an example of the processing of the control unit.

Next, the processing of the control unit 80 will be described with reference to FIGS. 1 to 3. FIG. 3 is a flowchart illustrating the processing in the normal mode M1 of the control unit 80.

In step S101, as illustrated in FIG. 3, the control unit 80 determines whether or not a print job has been received from outside. If the control unit 80 determines that a print job has been received (Yes in step S101), the processing of the control unit 80 proceeds to step S103. If the control unit 80 determines that no print job has been received (No in step S101), the processing of the control unit 80 proceeds to step S107.

In step S103, the control unit 80 controls the operation of the print engine unit 10 via the engine control unit 20, thereby causing the image forming unit 11 to execute image forming processing. When the processing of step S103 is completed, the processing of the control unit 80 proceeds to step S105.

In step S105, the control unit 80 sets the waiting time TW in the second timer 60 to start the counting operation. When the processing of step S105 is completed, the processing of the control unit 80 proceeds to step S107.

In step S107, the control unit 80 determines whether or not the energy saving key 42 has been depressed. When the control unit 80 determines that the energy saving key 42 has been pressed (Yes in step S107), the processing of the control unit 80 proceeds to step S111. When the control unit 80 determines that the energy saving key 42 has not been depressed (No in step S107), the processing of the control unit 80 proceeds to step S109.

In step S109, the control unit 80 determines whether or not the second timer 60 has finished counting. When the control unit 80 determines that the second timer 60 has finished counting (Yes in step S109), the processing of the control unit 80 proceeds to step S111. If the control unit 80 determines that the second timer 60 has not finished counting (No in step S109), the processing of the control unit 80 returns to step S101.

In step S111, the control unit 80 determines the transition from the normal mode M1 to the second power saving mode M3. When the processing of step S111 is completed, the processing of the control unit 80 proceeds to step S113.

In step S113, the control unit 80 sets the first time T1 in the first timer 50 to start the counting operation. When the processing of step S113 is completed, the processing of the control unit 80 proceeds to step S115.

In step S115, the control unit 80 instructs the second power saving state to the power control unit 70. When the processing of step S115 is completed, the processing of the control unit 80 is completed.

Figure 4:
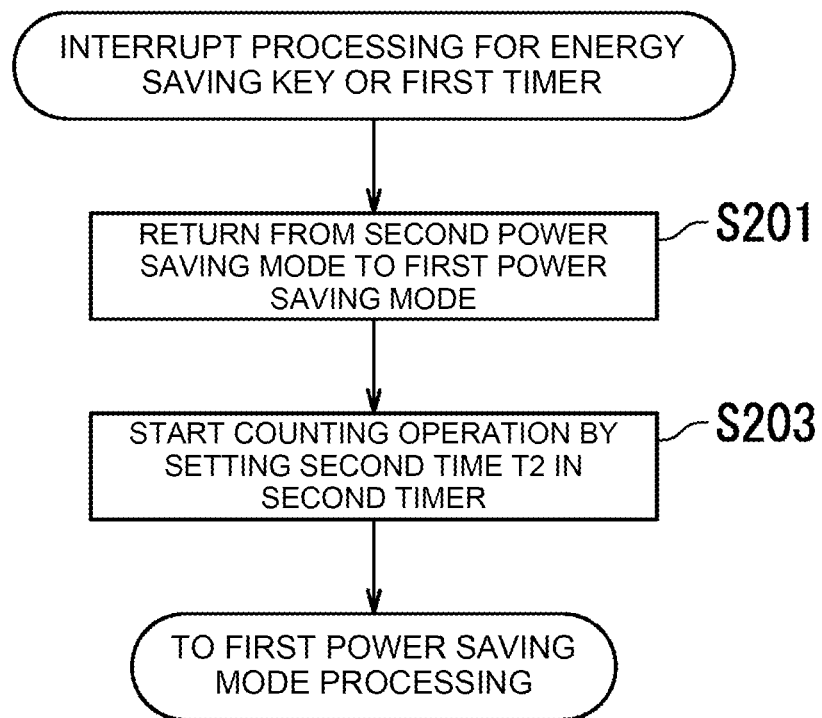
FIG. 4 is a flowchart illustrating an example of the processing of the control unit.

Next, with reference to FIGS. 1 to 4, the processing of the control unit 80 will be further described. FIG. 4 is a flowchart illustrating the interrupt processing of the control unit 80. When the first interrupt signal is supplied from the energy saving key 42 or the second interrupt signal is supplied from the first timer 50, after the power control unit 70 starts supplying the operation power supply voltage to the control unit 80, the control unit 80 executes the interrupt processing illustrated in FIG. 4.

In step S201, as illustrated in FIG. 4, the control unit 80 determines return from the second power saving mode M3 to the first power saving mode M2. When the processing of step S201 is completed, the processing of the control unit 80 proceeds to step S203.

In step S203, the control unit 80 sets the second time T2 in the second timer 60 to start the counting operation. When the processing of step S203 is completed, the processing of the control unit 80 proceeds to the processing of the first power saving mode M2 illustrated in FIG. 5.

Figure 5:
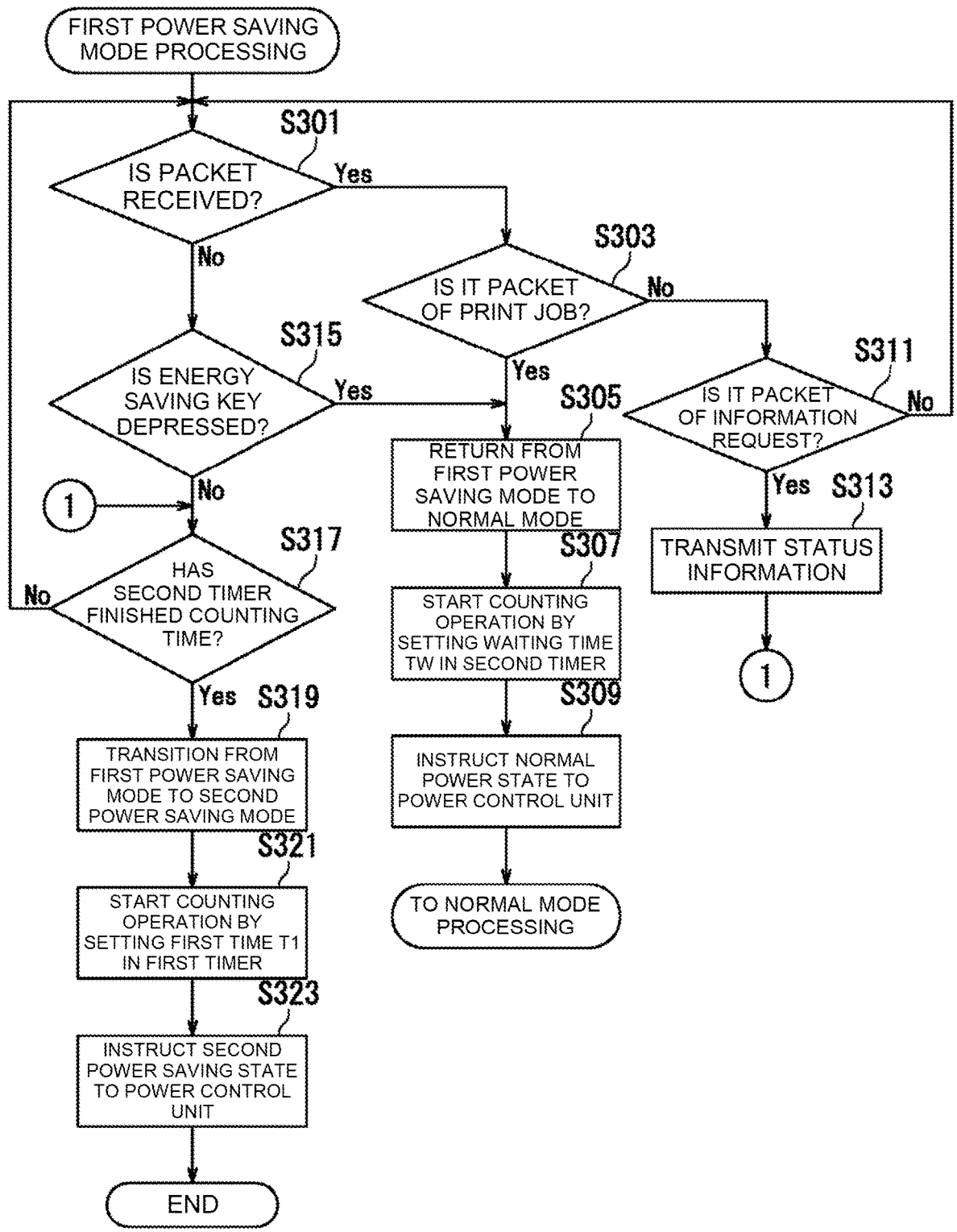
FIG. 5 is a flowchart illustrating an example of the processing of the control unit.

Next, with reference to FIGS. 1 to 5, the processing of the control unit 80 will be further described. FIG. 5 is a flowchart illustrating the processing in the first power saving mode M2 of the control unit 80.

In step S301, as illustrated in FIG. 5, the control unit 80 determines whether or not a packet is received by the reception unit 32. When the control unit 80 determines that a packet is received (Yes in step S301), the processing of the control unit 80 proceeds to step S303. When the control unit 80 determines that there is no packet reception (No in step S301), the processing of the control unit 80 proceeds to step S315.

In step S303, the control unit 80 determines whether the packet received by the reception unit 32 is a packet of a print job. If the control unit 80 determines that the received packet is a packet of a print job (Yes in step S303), the processing of the control unit 80 proceeds to step S305. If the control unit 80 determines that the received packet is not a print job packet (No in step S303), the processing of the control unit 80 proceeds to step S311.

In step S305, the control unit 80 determines return from the first power saving mode M2 to the normal mode M1. When the processing of step S305 is completed, the processing of the control unit 80 proceeds to step S307.

In step S307, the control unit 80 sets the waiting time TW in the second timer 60 to start the counting operation. When the processing of step S307 is completed, the processing of the control unit 80 proceeds to step S309.

In step S309, the control unit 80 instructs the normal power state to the power control unit 70. When the processing of step S309 is completed, the processing of the control unit 80 proceeds to the processing of the normal mode M1 illustrated in FIG. 3.

In step S311, the control unit 80 determines whether or not the packet received by the reception unit 32 is a packet of an information request. When the control unit 80 determines that the received packet is an information request packet (Yes in step S311), the processing of the control unit 80 proceeds to step S313. When the control unit 80 determines that the received packet is not an information request packet (No in step S311), the processing of the control unit 80 returns to step S301.

In step S313, the control unit 80 causes the transmission unit 31 to transmit status information. For example, the status information includes information on the remaining amount of paper and the remaining amount of toner. When the processing of step S313 is completed, the processing of the control unit 80 proceeds to step S317.

In step S315, the control unit 80 determines whether or not the energy saving key 42 has been depressed. When the control unit 80 determines that the energy saving key 42 has been pressed (Yes in step S315), the processing of the control unit 80 proceeds to step S305. When the control unit 80 determines that the energy saving key 42 has not been depressed (No in step S315), the processing of the control unit 80 proceeds to step S317.

In step S317, the control unit 80 determines whether or not the second timer 60 has finished counting. When the control unit 80 determines that the second timer 60 has finished counting (Yes in step S317), the processing of the control unit 80 proceeds to step S319. If the control unit 80 determines that the second timer 60 has not finished counting (No in step S317), the processing of the control unit 80 returns to step S301.

In step S319, the control unit 80 determines the transition from the first power saving mode M2 to the second power saving mode M3. When the processing of step S319 is completed, the processing of the control unit 80 proceeds to step S321.

In step S321, the control unit 80 sets the first time T1 in the first timer 50 to start the counting operation. When the processing of step S321 is completed, the processing of the control unit 80 proceeds to step S323.

In step S323, the control unit 80 instructs the second power saving state to the power control unit 70. When the processing of step S323 is completed, the processing of the control unit 80 is completed.

Figure 6A:
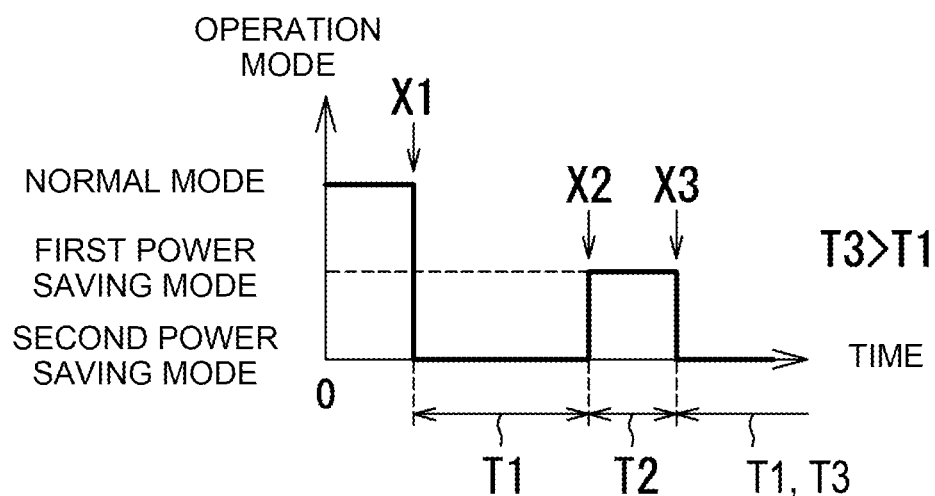
FIGS. 6A and 6B are timing charts each illustrating an example of transition of an operation mode.
Figure 6B:
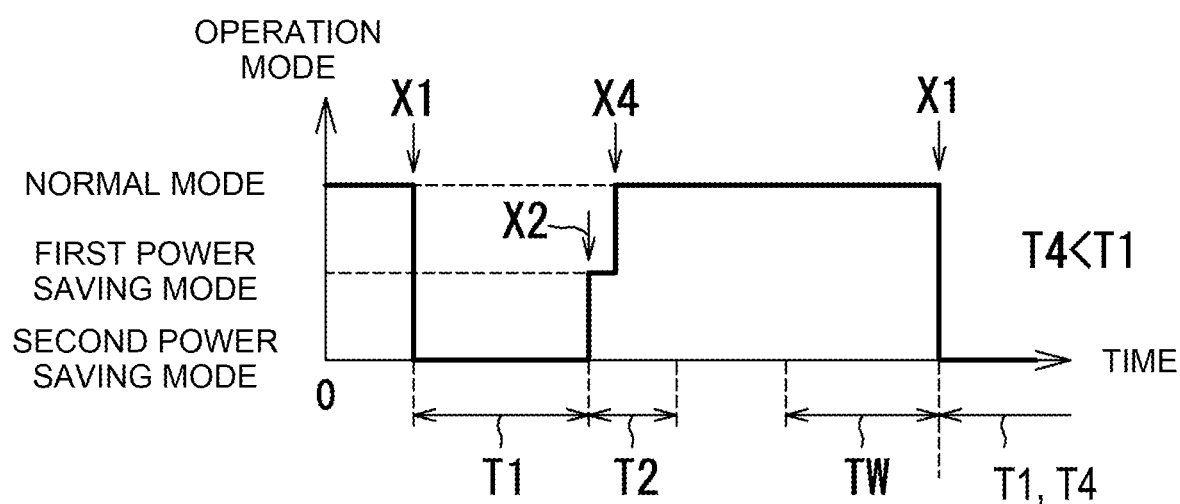

Next, the transition timing of the operation mode will be described with reference to FIGS. 1 to 5, FIG. 6A, and FIG. 6B. FIGS. 6A and 6B are timing charts illustrating an example of the transition of the operation modes, respectively.

As illustrated in FIG. 6A, immediately after the operation mode of the image forming apparatus 100 is switched from the normal mode M1 to the second power saving mode M3 due to the occurrence of the first factor X1, the first timer 50 starts counting the first time T1. Until the timing of the first time T1 is completed, the first timer 50 suppresses the switching from the second power saving mode M3 to the first power saving mode M2 by the operation mode control unit 81 even if the reception unit 32 receives a large number of packets. Accordingly, the overhead of the control unit 80 including the operation mode control unit 81 is reduced, to improve the energy saving performance indicated by, for example, a TEC (Typical Electricity Consumption) value.

As further illustrated in FIG. 6A, the operation mode of the image forming apparatus 100 is switched from the second power saving mode M3 to the first power saving mode M2 due to the occurrence of the second factor X2 whose content is the second interrupt signal of the first timer 50. The second timer 60 starts counting the second time T2 immediately after the second power saving mode M3 is switched to the first power saving mode M2. The operation mode control unit 81 does not switch the first power saving mode M2 to the second power saving mode M3 and does not allow the power control unit 70 to switch the first power saving state to the second power saving state until the timing of the second time T2 is completed.

As further illustrated in FIG. 6A, the operation mode of the image forming apparatus 100 is switched from the first power saving mode M2 to the second power saving mode M3 due to the occurrence of the third factor X3 whose content is the completion of counting of the second timer 60. The first timer 50 starts counting the first time T1 again immediately after the first power saving mode M2 is switched to the second power saving mode M3. However, when the reception unit 32 receives the packet of the information request in the first power saving mode M2, the first timer 50 may count the third time T3 longer than the first time T1 instead of counting the first time T1. This is because the possibility that the reception unit 32 receives a packet of an information request again decreases.

As illustrated in FIG. 6B, the operation mode of the image forming apparatus 100 is switched from the second power saving mode M3 to the first power saving mode M2 due to the occurrence of the second factor X2 whose content is the second interrupt signal of the first timer 50. The second timer 60 starts counting the second time T2 immediately after the second power saving mode M3 is switched to the first power saving mode M2. However, if a fourth factor X4, whose content is the reception of a packet of a print job by the reception unit 32, occurs before the second timer 60 finishes counting the second time T2, the operation mode of the image forming apparatus 100 is switched from the first power saving mode M2 to the normal mode M1. An image forming unit 11 executes image forming processing. After the completion of the print job, the second timer 60 starts counting the waiting time TW. Thereafter, the operation mode of the image forming apparatus 100 is switched from the normal mode M1 to the second power saving mode M3 due to the occurrence of the first factor X1 whose content is the completion of the counting of the second timer 60. The first timer 50 starts counting the first time T1 again immediately after the normal mode M1 is switched to the second power saving mode M3. However, when the image forming unit 11 executes the image forming processing in the normal mode M1, the first timer 50 may count the fourth time T4 shorter than the first time T1 instead of counting the first time T1. This is because the possibility that the reception unit 32 receives a packet of an information request again increases.

Embodiments of the present disclosure have been described above with reference to the drawings. However, the present disclosure is not limited to the embodiments described above, and it is possible to carry out the present disclosure in various embodiments without departing from the gist thereof. Various disclosures can be formed by appropriately combining a plurality of components disclosed in the above embodiments. For example, some of the components may be removed from all of the components shown in the embodiments. In order to facilitate understanding, each of the components is shown schematically, and the number or the like of each illustrated component may be different from the actual one due to the convenience of drawing preparation. Each of the components shown in the above embodiments is by way of example, and is not particularly limited, and various modifications can be made without departing substantially from the effects of the present disclosure.

In the embodiment of the present disclosure, the image forming apparatus 100 is a printer, but the present invention is not limited thereto. The image forming apparatus 100 may be a multi-function peripheral (MFP) having a plurality of functions including a printing function.

In the embodiment of the present disclosure, the image forming apparatus 100 adopts an electrophotographic method, but the present invention is not limited thereto. The image forming apparatus 100 may adopt an inkjet method.

INDUSTRIAL APPLICABILITY

The present disclosure is available in the field of image forming apparatus.

What is claimed is:

1. An image forming apparatus comprising:
an image forming unit that forms an image on a recording medium;
a power control unit that controls to switch between a normal power state in which an operation power supply voltage is supplied to the image forming unit, a first power saving state in which power consumption is reduced from the normal power state by not supplying the operation power supply voltage to the image forming unit, and a second power saving state in which power consumption is reduced from the first power saving state; and
an operation mode control unit that controls to switch between a normal mode which is an operation mode corresponding to the normal power state, a first power saving mode which is an operation mode corresponding to the first power saving state, and a second power saving mode which is an operation mode corresponding to the second power saving state,
wherein the operation mode control unit suppresses is arranged to be suppress switching from the second power saving mode to the first power saving mode until a first time elapses immediately after switching to the second power saving mode, even if information directed to an image forming apparatus is received from outside.

2. The image forming apparatus according to claim 1, further comprising a first timer that starts counting the first time immediately after switching to the second power saving mode,
wherein the information is such information that is received through a USB cable.

3. The image forming apparatus according to claim 2,
wherein, the information is an information request, and
wherein after the reception unit receives a packet of the information request is received through the USB cable in the first power saving mode, instead of counting the first time, the first timer counts a third time longer than the first time immediately after the first power saving mode is switched to the second power saving mode.

4. The image forming apparatus according to claim 2,
wherein the first timer counts a fourth time shorter than the first time immediately after the image forming unit is switched from the normal mode to the second power saving mode after image forming processing is executed in the normal mode.

5. The image forming apparatus according to claim 2,
further comprising a second timer that counts a second time,
wherein the second timer starts counting the second time immediately after the second power saving mode is switched to the first power saving mode, and
wherein the operation mode control unit does not switch the first power saving mode to the second power saving mode until the counting of the second time is completed, and the power control unit does not switch the first power saving state to the second power saving state.

* * * * *